(12) United States Patent
Roach

(10) Patent No.: US 11,519,535 B2
(45) Date of Patent: Dec. 6, 2022

(54) PIPE GRIP

(71) Applicant: Troy Daniel Roach, Ooltewah, TN (US)

(72) Inventor: Troy Daniel Roach, Ooltewah, TN (US)

( * ) Notice: Subject to any disclaimer, the term of this patent is extended or adjusted under 35 U.S.C. 154(b) by 316 days.

(21) Appl. No.: 16/889,895

(22) Filed: Jun. 2, 2020

(65) Prior Publication Data

US 2021/0372545 A1 Dec. 2, 2021

(51) Int. Cl.
*F16L 21/08* (2006.01)
*F16L 21/03* (2006.01)

(52) U.S. Cl.
CPC ............... *F16L 21/08* (2013.01); *F16L 21/03* (2013.01)

(58) Field of Classification Search
CPC ......... F16L 21/08; F16L 21/03; F16L 33/003; F16L 33/02; F16L 33/04; F16L 33/06; F16L 33/08; F16L 33/085; F16L 33/10; F16L 33/12; F16L 33/18; F16L 33/22; F16L 33/228; F16L 17/06; F16L 17/063
USPC ......................................... 285/252, 253, 305
See application file for complete search history.

(56) References Cited

U.S. PATENT DOCUMENTS 7,963,569 B2 * 6/2011 Subbaraman .... B29C 66/52292
285/305
10,156,305 B2 * 12/2018 Manning ............... F16L 37/148

* cited by examiner

*Primary Examiner* — Aaron M Dunwoody
(74) *Attorney, Agent, or Firm* — Miller & Martin PLLC; Stephen J. Stark

(57) ABSTRACT

A pipe grip is having an ability to apply increased compressive pressure against an exterior surface of an inserted spigot end of a pipe internal to a bell end of a pipe such as indirectly against a gasket to provide an improved pipe seal or directly against the exterior surface to provide a pipe restraint so as to prevent the spigot end from pulling out from the bell end in an undesired manner. The pipe grip preferably applies one of tension and/or movement of a tensioner from internal to the bell end of the pipe such as from a groove through a bore to an external surface of a pipe where a tension applying device applies tension so as to at least one of move and/or apply tension to the tensioner through one or more bores which extend from the external surface of the bell end of the pipe to an internal surface of the bell end of the pipe to direct a compressive force onto the inserted pipe section.

15 Claims, 6 Drawing Sheets

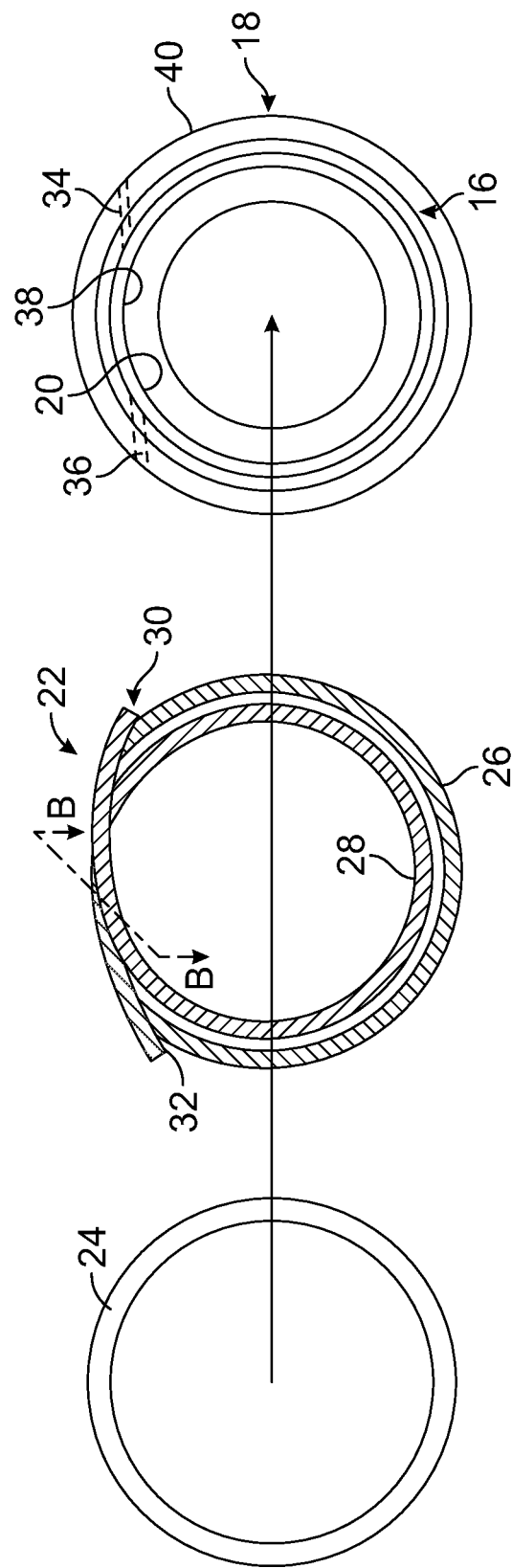
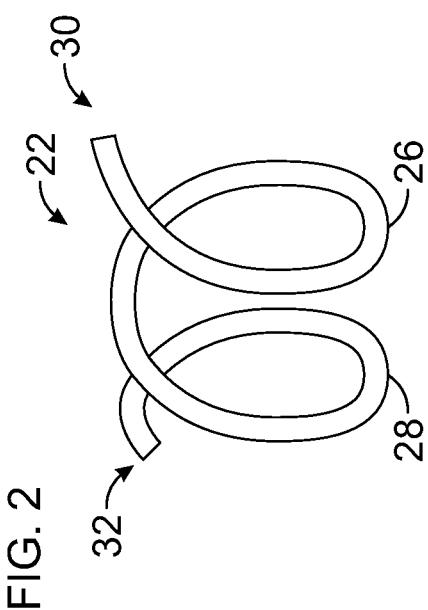
FIG. 2
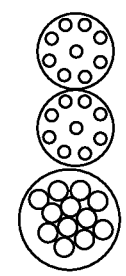
FIG. 3
FIG. 4

PIPE GRIP

FIELD OF THE INVENTION

The present invention relates to a pipe grip, and more particularly, to a tightening device utilized with pipes, in particular pipe joints, whereby tension is applied through a tightener or tensioner from a bore extending through an exterior surface of a first pipe section to an internal portion of the first pipe section so that the tightener restricts and/or applies a compressive force about an exterior surface of a second pipe section, possibly through a gasket, as a pipe restraint, to activate teeth of a wedge, and/or provide other functions. The first pipe section may be a pipe, a flange, a coupler, a valve, or other piping portion which surrounds and connects to an inserted pipe portion.

BACKGROUND OF THE INVENTION

If two water pipes are joined with one of the water pipes having a bell end receiving the spigot end of another pipe therein, it is possible that leak can occur in some situations which is undesirable.

In the prior art, bell joint leak clamps for cast iron, ductile iron, and other pipe sections have been created which basically include two pairs of C-shaped half sections which respectively bolt together about adjacent pipe sections and then each pair connects with tie rods which work to pull the two pairs together at a joint possibly while also pushing an initially split gasket (often glued together after placing around the pipe section to attempt to prevent leaking through the gap) into a gap between the pipe sections. Companies such as JCM Industries, Smith-Blair, Romac Industries, Inc., The Skinner Company, Trupply LLC, and many other companies make these type bell joint leak clamp constructions that are well known in the art.

Ford Meter Box Company Inc., and presumably other manufacturers, make and/or sell pipe restraints which have a plurality of teeth disposed internal to a flange (marketed under the brand Uni-Flange™). Each of the teeth are directed radially inwardly and have a corresponding bolt for each tooth each tooth must be individually directed inwardly by rotating the bolt appropriately.

Also, gaskets are often glued to an inner surface of a bell end of a piping segment, often in a gasket groove. If they are not glued in place, then when a spigot end of a pipe segment is inserted, it may be that there may be leakage about a radially outward portion of the gasket internal to the bell section of the outer pipe portion.

When connecting pipe sections to a valve or other fitting, a common construction is a mechanical joint end which normally involves a flanged terminal end of a pipe which receives a sealing gasket, possibly a spacer and then a split ring internal to a flange which may connect over a pipe portion. The flange then is bolted with a series bolts to the flange at the flanged end of the pipe. When tightening the bolts, one common problem is the split ring compresses and grabs an inserted pipe portion before the gasket compresses satisfactorily at or about the pipe portion at the flanged end. Accordingly, the restraining action can occur before sealing which is not what is often desired. What would be preferred is a construction that seals satisfactorily with the restraining action being a secondary consideration, not vice versa.

Couplers are often utilized in the prior art to connect dissimilar pipe material together. Water pipes normally have a common inner diameter for a specific setting, such as a three inch, six inch, eight inch, etc. specification. However, depending on the material of the pipe (steel, cast iron, ductile iron, pvc, etc.), the outer diameter could vary as much as three quarters of an inch for at least some water pipe constructions. Couplers have a center portion which bell ends which receive inserted pipe therein. Gaskets are located over the pipe sections and outwardly from the gaskets are flanges that compress the gaskets as they are tightened about the inserted pipe sections. There are often at least four bolts which must be tightened (incrementally as specified by the manufacturer) in order to achieve a seal at the coupling to the inserted pipe segments. However, the person installing the coupler may over-tighten a bolt at a specific step before tightening other bolts and, or otherwise not achieve a desired seal to have undesired leakage.

While bell joint leak clamps, and the other components and others described above, can certainly work for their intended purposes, they can have disadvantages and/or be improved upon. Accordingly, an improved device and/or method of sealing and/or restraining pipe are believed to be desirable in the marketplace.

SUMMARY OF THE INVENTION

Accordingly, it is an object of many embodiments of the present invention to provide an improved method and/or device for sealing a pipe joint of a bell and spigot type pipe joint connection.

It is another object of many embodiments of the present invention to provide an improved method and/or device for restraining as spigot end of a pipe section relative to a bell end (or receiving end) of an adjacent pipe section (to keep it from inadvertently separating, such as when pressurized within).

It is another object of many embodiments of the present invention to provide an improved method and/or device for possibly assisting in sealing and/or restraining a spigot end of a pipe section relative to a bell end (or receiving end) of an adjacent pipe or other component section in a fluid or other pipe system.

It is another object of many embodiments of the present invention to provide an improved method and/or device for applying a circumferentially applied gripping force about an installed gasket internal to a bell end (or receiving end) of a piping component about a spigot end (inserted end) of an adjacent pipe section along the plane of the gasket.

It is another object of many embodiments of the present invention to provide an improved double looped tensioning system for use with at least one of pipe gaskets, as a pipe restraint, pipe wedges and/or other uses.

Accordingly, in accordance with many embodiments of the present invention a spigot end (or inserted end) of a first pipe section is inserted into a bell end (or receiving end) of an adjacent pipe section (which could also be a valve, a coupling a flange or other structure) to form a joint or connection of or at a fluid pipe such as a pipe carrying potable water, waste water, gas and/or other fluids. A gasket is often provided within a gasket groove.

For at least some embodiments of the presently preferred embodiments, a tensioner is provided about at least a portion of the gasket which may be provided as at least one (or portion thereof), if not a double, or more, looped construction which may directed through, or at least acted upon through, a bore extending the bell end (receiving end) of the pipe section. I.e., the bore extends intermediate an external surface to an internal surface proximate to the bell end, possibly to an internal groove, preferably having been machined and/or otherwise provided. The gasket could be glued at the groove, but not so as to impede the operation of the tensioner. The tensioner is at least one of shortened in length and/or applied a tension so as to constrict, i.e., compress, t the gasket about the exterior surface of the spigot end (received end) of the inserted pipe section. For some embodiments the tensioner may be a cable, wire, band and/or other suitable material or various possibly shapes, which possibly may be increased in tension such as with a bolt about a threaded end of the tensioner and/or by a pipe strap clamp type construction (such as a U-Bar manual hold down toggle clamp or others as manufactured under the brand DESTACO™ and other clamps) which grabs, or otherwise directs a pulling or tension force to, at least one end of a tensioner and/or when transitioned from unlocked to a locked position and/or to a more locked position, pulls and/or applies a tension to and/or shortens the tensioner internal to the bell end (receiving end) of the pipe section (inserted pipe) whereby the tensioner applies a compressive force either directly or indirectly toward and/or on the exterior surface of the pipe section.

For other embodiments, the same type structure may be utilized to apply a tension and/or shortened tensioner to provide a pipe restraint internal to a bell end (receiving end) of a pipe section or other piping component so that a pipe restraint may act compressively upon an exterior surface of a spigot end (inserted end) of an inserted pipe section. Still other embodiments may have one or more tensioners which apply compressive pressures onto a gasket at one location and as a restraint at a separate location, possibly simultaneously with one or more tension application devices. These, or other embodiments may utilize this type tensioning system to apply tension to teeth of a wedge to assist in restraining pipe as well.

It is possible that one or both of the ends of the tensioner may be applied with tension either directly or indirectly, but if only one end is directly applied with tension, the other end may be provided with a stop so as to hold it in a fixed location internal either internally to the bell end (receiving end) of the pipe section such as to terminate in a gasket or otherwise, or externally, possibly by extending an end of the tensioner through a second bore through the bell end (receiving end) of the pipe section.

BRIEF DESCRIPTION OF THE DRAWINGS

The accompanying drawings illustrate the preferred embodiments of the invention and, together with the description, serve to explain the invention. These drawings are offered by way of illustration and not by way of limitation:

FIG. 2 is an exploded view of the bell end of a pipe section of the presently preferred embodiment of the present invention with a tensioner as could be installed in a first groove and then directed through first and second bores in the bell end of the pipe section as shown in phantom with a gasket then installed internal thereto, possibly in the gasket or first groove;

FIG. 3 is a cross section of the line B-B shown in FIG. 2;

FIG. 4 shows a side perspective view of the tensioner shown in FIG. 2;

DETAILED DESCRIPTION OF THE PREFERRED EMBODIMENT

Figure 1:
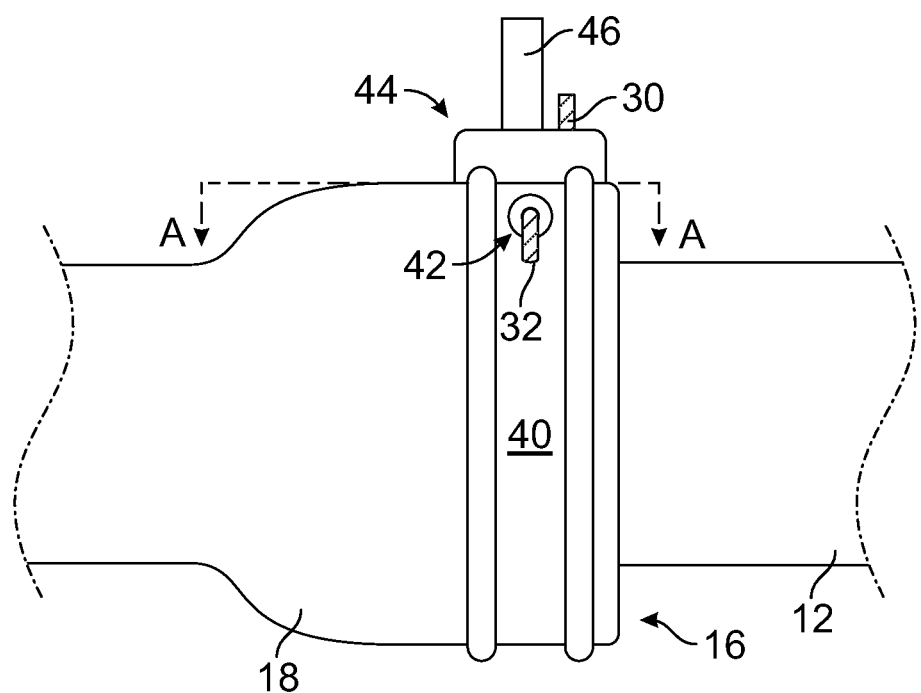
FIG. 1 is a side plan view of a presently preferred embodiment of the present invention.

FIG. 1 shows a pipe grip or connection 10 of a presently preferred embodiment of the present invention having a first pipe segment 12 having an inserted end illustrated as a spigot end 14 which is received in a receiving end illustrated as a bell end 16 of possibly a similarly constructed second pipe segment 18. Be aware that not only does this technology apply to bell/spigot connections of identical pipe segments together, but also to couplers connecting to pipe segments, flanges connected to pipe segments, fittings, valves, mechanical pipe joints or other components where an inserted pipe section is received internally to a receiving end of a component, often referred to herein as a bell end 16 of a second pipe segment 18. Also, while water pipes (potable such as, but not limited to, drinking water supply systems of most water utility companies normally under at least some pressure, wastewater such as, but not limited to sewer lines, etc.) are the focus of many uses of the technology disclosed herein, other uses of this technology may become apparent to those of ordinary skill in the art. Fluid often passes through interior of pipe segments 12,18 for many embodiments, often, preferably without leaking.

The improvement of the invention may relate to the construction of the pipe grip or pipe connection 10. Specifically, at least a first groove 20, if utilized, which may be one of a restraint groove or a gasket groove is illustrated in FIG. 2. Internal or at the first groove 20, or at least along an interior surface or internal surface 38 may be located a tensioner 22 which is preferably inserted with or before an optional gasket 24. The gasket 24 may often be utilized to at least assist in providing a seal connection at the pipe connection 10. Tensioner 22 may be made of any suitable material but the applicant has discovered that braided cable is an appropriate steel and have been particularly satisfactory material. Other material and/or shapes may be utilized with other embodiments whether it be coated braided cable, wire, rope of various material(s), line of various material(s), strap, belt, or other appropriate construction. Some embodiments may have tensioner 22 formed with, connected integrally with, and or otherwise contact gasket 24. Gasket 24 can be a suitable resilient or at least semi-resilient material as are often utilized in the marketplace for gaskets.

Figure 8:
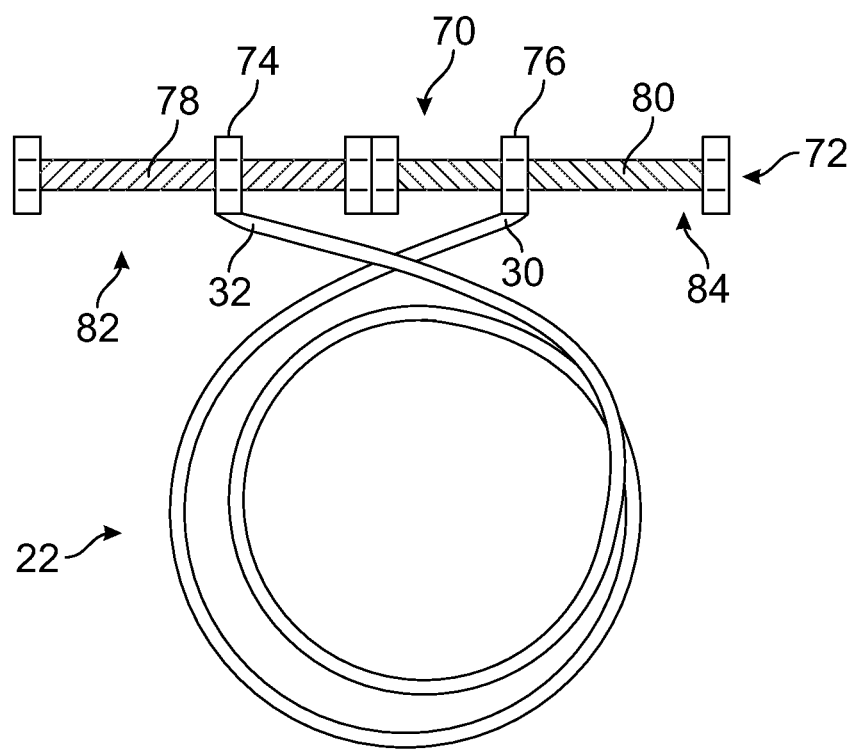
FIG. 8 shows a front plant view of a tensioner with a tension application device as could be utilized with the embodiments of FIGS. 1-7.

FIG. 2-4 show the preferred construction of the tensioner 22 which can be a double loop 26,28 construction which could then have two terminal ends 30,32. Other embodiments may have a single loop 26,28 construction (or a portion thereof) while still other embodiments may have even more loops 26,28 (or partial loops) etc. At least one, if not both of terminal end(s) 30,32 preferably may be directed through at least one of bores 34,36 (both need not be provided for all embodiments) that may extend from an internal surface 38 such as may be internal to the first groove 20, or not, to and through an exterior surface 40 proximate to the bell end 16 of the pipe section 18. It may be that some embodiments have a single bore 34 or 36. Bore(s) 34,36 provide a passage through the material forming the second pipe section 18 (or second section, if not a pipe). FIG. 8 shows the tensioner 22 removed from the bell end 16 with a tension application device in the form of a reverse turnbuckle construction 70 connected thereto.

FIG. 1 shows one of a stop and a connector 42 connected to the second terminal end 32 external to exterior surface 40 (or at exterior surface 40). Second terminal end 32 could also be located internal to the pipe section 18 for other embodiments. The first terminal end 30 is shown connected to a pipe strap clamp 44 which with movement of handle 46 can pull the first terminal end 30 so as to tighten and/or displace the first terminal end 30 to shorten at least one (or a portion of) of the first and second loops 26,28 about one of the exterior surface 48 of the first pipe section 12.

While pipe strap clamp construction could be utilized with various embodiment as a tension application device, a thread and bolt connection could also be utilized or other tension application device could be utilized. A threaded first end 30 and a bolt 49 construction could be utilized to similarly tighten the tensioner 22 compressively about a gasket 24 and/or the exterior surface 48 as may be seen in further detail in the remaining figures. Rotating the bolt 48 about threaded first end 30 (or other end) with the bolt against exterior surface 48 (or other structure) so as to pull the tensioner 22 in tension.

Figure 5:
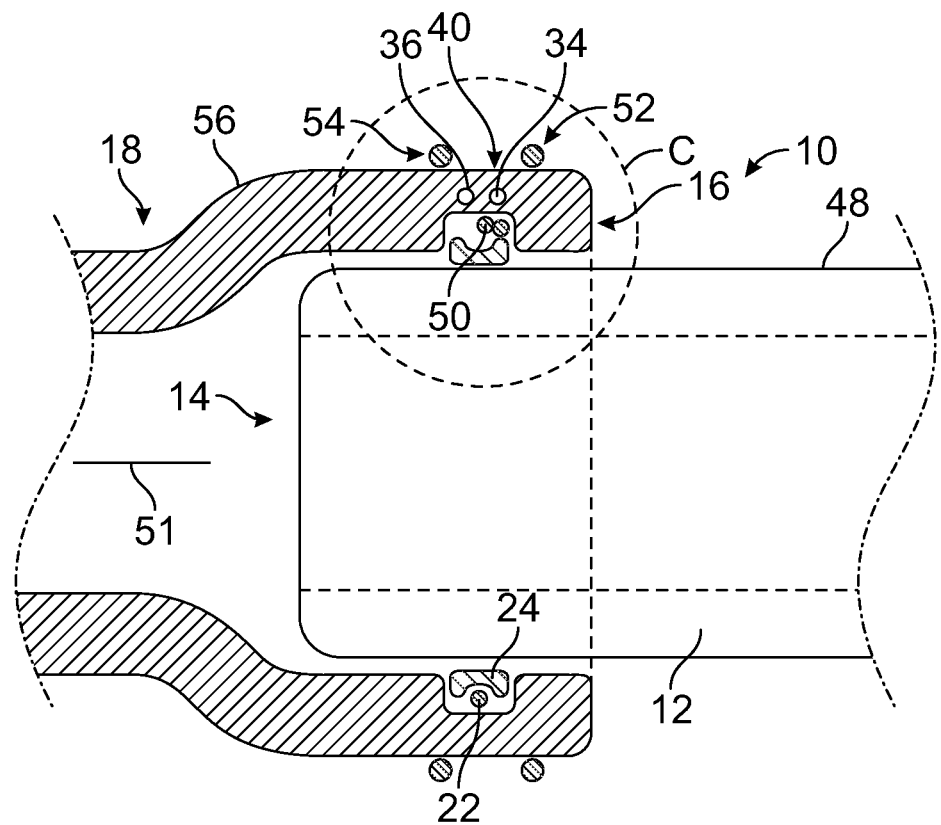
FIG. 5 shows a cross sectional view taken along line A1A in FIG. 1.
Figure 6:
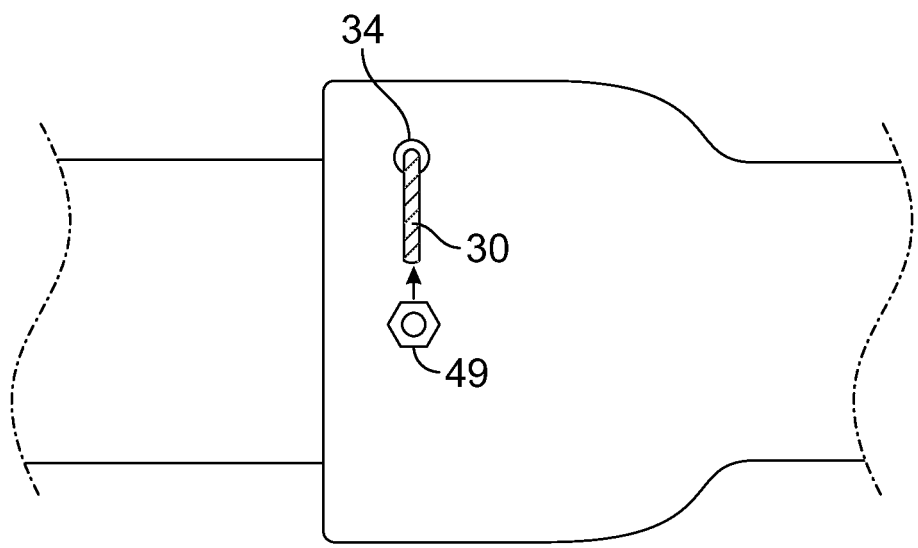
FIG. 6 shows a side plan view of an alternate embodiment of one of a stop and a tensional application device.

FIG. 5 is a cross sectional view along the lines A-A of FIG. 1. Specifically, the tensioner 22 could have a first end 30 directed through bore 36 and a second end 32 end directed through bore 34. One of ordinary skill in the art will observe that the bores 34,36 may be offset from one another but could be colinear for some embodiments although such a construction is not preferred for a double loop tensioner 22 as illustrated in FIGS. 2-4. For this construction the tensioner 22 tends to have a center loop 50 which is actually located intermediate (and is a portion of) the first and second loops 26,28 near the ends 30,32. The center loop 50 tends to stay centered along axis 51 while tension is applied to the tensioner 22.

This centering effect does not occur with a single loop tensioner 22 but some embodiments may be able to address that the forces applied by a single loop, or partial loop, construction. For example, many restraints may be satisfactory with 90-180 degrees of contact with a tensioner 22 on an outer surface 48 of an inserted pipe section 12. A portion of a single loop may be satisfactory for some embodiments, but other embodiments may employ at least one, if not two or more than two loops 26,28.

The applicant has found that for many embodiments a double loop 26,28 tensioner 22 is desirable since if either end 30 or 32 is applied tension the center loop 50 tends to stay centered with the application of tension to one of the ends 30,32. The center loop 50 is really a portion of one of the first or second loops 26,28 depending on how it is viewed. Pipe strap clamp 44 (and/or other tension application device) may be applying tension about one or more straps 52,54 about the exterior surface 56 of the pipe segment 18. The center loop 50 is shown applying pressure to compress gasket 24 by the exterior surface 48 of the first pipe segment 12 in FIG. 5 as would be understood by those of ordinary skill in the art with the pulling of at least one of the ends 30,32 relative to the other as has been explained above.

Tension is selectively applied with the tensioner 22. Specifically, by applying tension with a tension application device, the tensioner 22 is pulled to provide a compressive force, either directly or indirectly onto an exterior surface 48 of the inserted or first pipe segment 12. This can either be with a center loop 50 in a centering manner, or even just a portion of a single loop (such as would be sufficient to provide a restraint, such as about 135 degrees, or other appropriate amount). The tension application device is located external to the second section (second pipe section 18) and applies and/or communicates the tension through at least one bore 34,36 which extends through the material forming the second pipe section 18 from an internal or interior surface 38 to an exterior surface 40 to the tensioner 22. Bores 34,36 are shown as being non-colinear, but could be colinear for at least some embodiments. First bore 34 may be closer to the end 16 than the second bore 36 for at least some embodiments.

Figure 7:
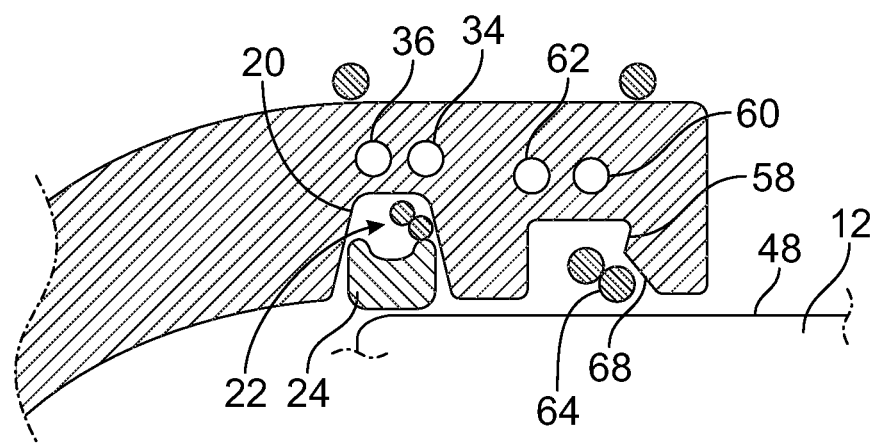
FIG. 7 shows a cross sectional view of an alternative embodiment of the bell in detail C shown in FIG. 5.

FIG. 7 shows an alternative embodiment of a receiving end of a second section illustrated as the bell end 16 shown in FIG. 5 which still has a first groove 20 in the form of a gasket groove but also includes a second groove 58 which could be a restraint groove. Grooves 20,58 are not required for all embodiments. The restraint or second groove 58 could have a second tensioner 64 somewhat similar, or not, to the first tensioner 22 or dissimilar to the first tensioner 22 which can proceed through one or more bores 60,62 in a similar dissimilar way as the first tensioner 22 proceeds through one or more bores 34,36 so as to apply tension to at least one loop of second tensioner 64 possibly in a restraining manner against exterior surface 48 of first pipe section 12 when installed. Additionally, with this type construction at least one terminal end 30 of the first and second tensioners 22,64 could be connected to a single tension application device such as a pipe clamp 44 so that when a pipe clamp 44 is tightened, tension to both of the first ends 30 of the first and second tensioners 22 may be applied simultaneously through the respective bores such as 34, 60 so that not only is the gasket 24 compressed to at least assist in providing a satisfactory seal, but the restraint 64 in the form of second tensioner is then tightened about exterior surface 48 of the first pipe section 12. Of course, other embodiments could have the restraints 22,64 operate independently, and both need not be provided for all embodiments (i.e., just a restraint could be provided in or outside of a groove 58 for at least some embodiments.

The second tensioner 64 in the second groove 58 could have an outer wall 68 of the groove 58 or other structure which may prevent the second tensioner from pulling out of the receiving end, bell end 16 of the pipe portion 12 when connected to a received end, spigot end 14 of a first pipe portion 12. Outer wall 68 may be angled such as between about 30-90 degrees, or more, relative to the inserted pipe portion 12. While 45 degrees is illustrated, 90 degrees works well for some embodiments.

While some embodiments may employ both the restraint and a gasket having the technology described herein, still other embodiments may just have a restraint which would involve second tensioner 64 which could apply tension to then direct a compressive force towards and/or onto the exterior surface 48 possibly without a gasket 24 as illustrated in FIG. 7, possibly without having the first tensioner 22 utilized in such embodiments.

FIG. 8 shows a tension application device in the form of a reverse turnbuckle type construction 70. Rotation of member 72 clockwise (although counterclockwise embodiments could also be constructed) rotates the nuts 74, 76 away from one another due to the reversed threads 78,80 on the shafts 82,84. When the nuts move away from one another the terminal ends 30,32 move away from one another thus constricting at least one of the loops 26,28, if not both (and/or center loop 50) directly or indirectly (i.e., through another structure) onto the exterior surface 48 of the inserted end, spigot end 14 of the first pipe portion 12. For every 3.1416 inches of movement of the ends 30,32 away from one another, the diameter of the center loop 50 effectively shortens by an inch. Other tension application devices of various constructions can be utilized to move and/or apply tension to the tensioner 22.

Figure 9:
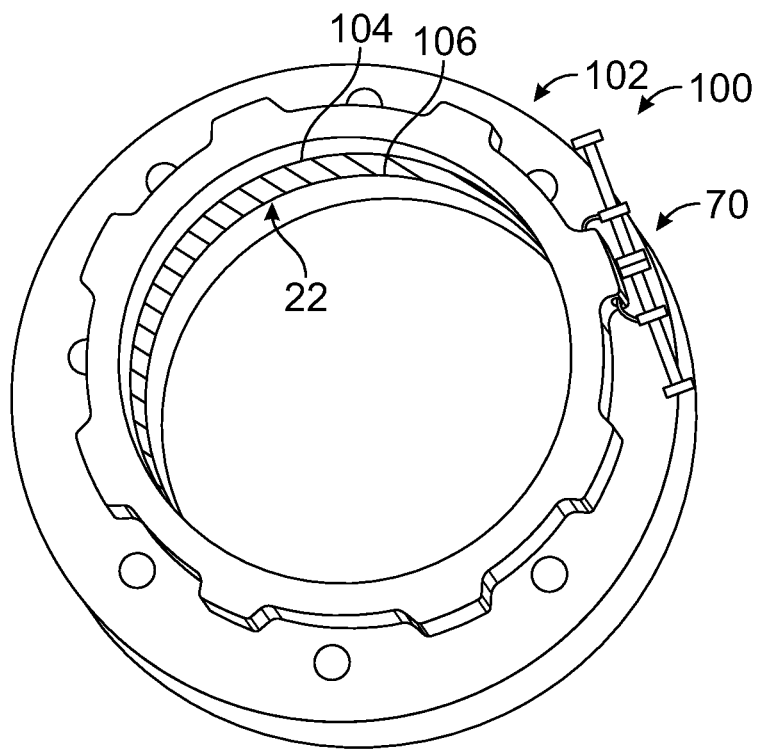
FIG. 9 shows a top perspective view of a flange with a restraint provided therein of an alternatively preferred embodiment utilizing the tensioner and tension application device of FIG. 8.

FIG. 9 shows a pipe restraint 100 in the form of a flange 102 having a tensioner 22 internally thereto such as in a groove 104 along an inner surface 106. Terminal ends 30,32 extend through bores through the flange to connect to the reverse turnbuckle construction 70 (although any of a variety of tension application devices could be utilized for various embodiments. The flange acts as a bell end 16 of a pipe segment 18 as described throughout this specification in this construction which is received about an inserted pipe segment 12 at an inserted end 14.

Figures 10, 11:
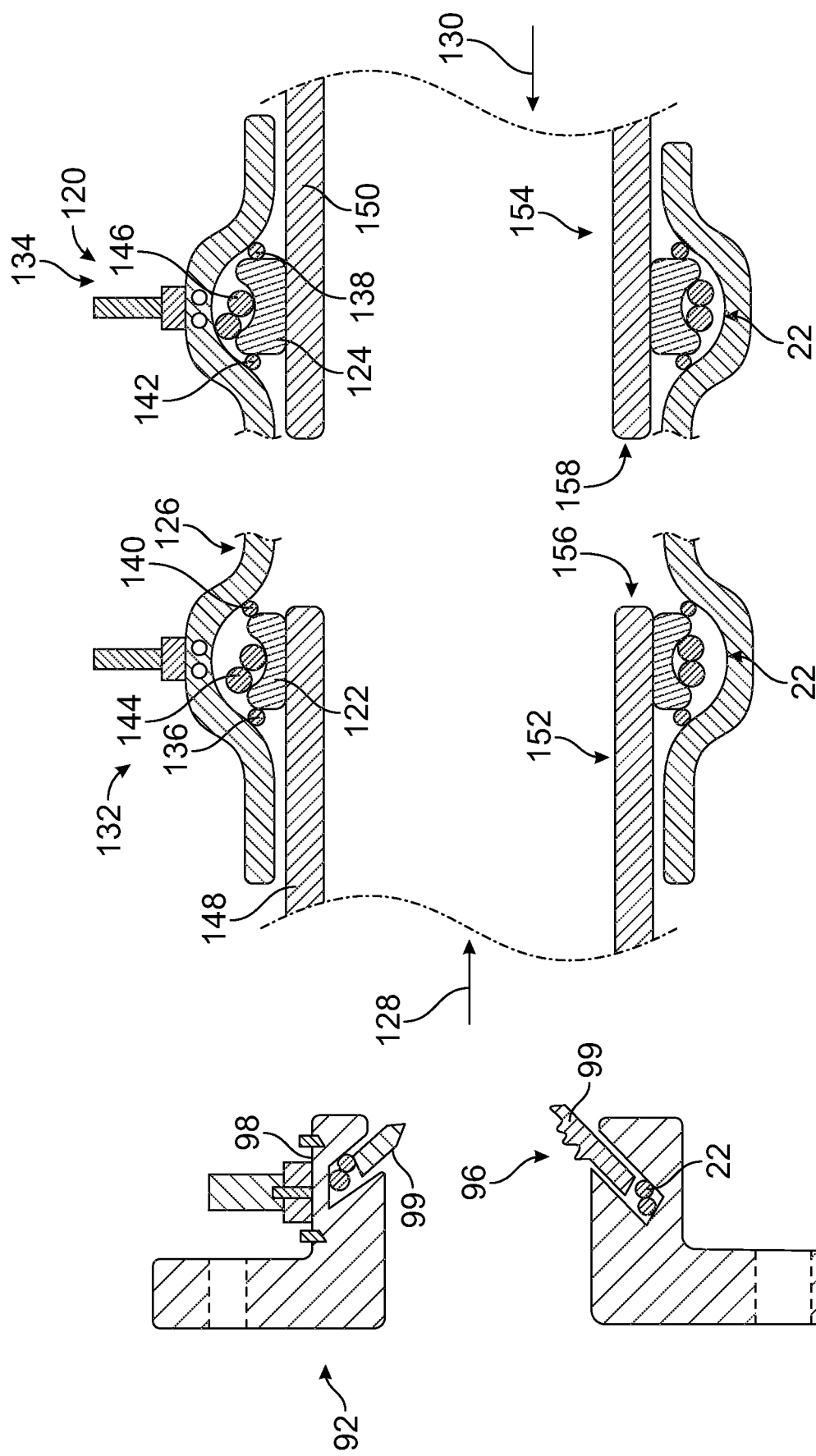
FIG. 10 shows a cross section view of a wedge in still another alternative embodiment.
FIG. 11 shows a cross sectional view of a coupler utilizing a tensioner of a presently preferred embodiment.

Still other embodiments may utilize the tensioner 22 to apply compressive force as a wedge which may formed as a flange 92 with teeth 94,96 as is shown and described in FIG. 10 or otherwise. Tensioner 22 is shown connected to a DESTACO™ clamp acting as a tension application device which connects to a terminal end 30,32 of the tensioner through a bore 98 and then selectively pulls the end 30 or 32 to constrict or compress at least one of loops 26,28,50 to compressively force at least some of teeth 94,96 (and others) about an inserted pipe section as would be understood by those of ordinary skill in the art. Teeth may have grips 99 (shown as serrations, but could be constructed otherwise) which may dig (through application of the compressive force of the tensioner 22) into the exterior surface 48 of the inserted pipe section 12.

FIG. 11 shows a coupler 120 of an embodiment using the tensioner 22 with one or more gaskets 122, 124. Coupler body 126 is shown with broken lines which is believed to assist in showing that the coupler body 126 could be a length as desired by the user as well as the diameter of first end 128 could be different from second end 130, if so desired (by way of example only, to connect a three inch pipe to a six inch pipe, or for other purposes), Each of the tensioners can be actuated with a tension application device, illustrated as clamps 132, 134, but other devices may be utilized with other embodiments. Gaskets 122,124 may be glued at least one location such as forward connection 136,138, or rear connection 140,142. Some gaskets 132,134 may be glued at both forward and rear connections 136,138 and 140,142, respectively. Glue locations may be in channels 144,146, or not. It is preferable for many embodiments that the gaskets 122,124 not be glued to the channels 144,146 at the tensioner 22.

With the application of the tension application device(s), the tensioners 22 are tightened to assist in compressing the gaskets 132,134 about exterior surfaces 148,150 of inserted pipe portions 152, 154 at inserted ends 156, 158. Gaskets 132,134 may remain glued to the channels 144,146 for at least some embodiments in the operating configuration of grapping inserted pipe sections or portions 152,154, such as illustrated to provide satisfactory seals.

Numerous alterations to the structures herein disclosed will suggest themselves to those skilled in the art. However, it is to be understood that the present disclosure relates to the preferred embodiment of the invention for which is for purposes of illustration only and not to be construed as a limitation of the invention. All such modifications which do not depart from the spirit of the invention are intended to be included within the scope of the appending claims.

What is claimed is:

1. A pipe grip comprising:
    a first pipe section having an exterior surface received internally to an end of a second section having an interior and exterior surface, said second section having a first bore extending intermediate the interior and exterior surface of the second section;
    a second bore extending intermediate the interior and exterior surfaces of the second section, said second bore spaced apart from the first bore;
    a tensioner selectively directing a compressive force toward the exterior surface of the first pipe section from internal to the interior surface of the second section;
    wherein a tension application device is connected to the tensioner through the first bore, said tension application device selectively communicating tension through the bore whereby the application of tension compresses at least a portion of the tensioner radially inwardly towards the exterior surface of the first pipe section; and
    wherein the tensioner applies a compressive force through a gasket contacting the exterior surface of the first pipe section.

2. The pipe grip of claim 1 wherein the gasket and tensioner are at least partially located in a first groove extending into the second section from the interior surface of the second section.

3. The pipe grip of claim 2 wherein the first bore extends from the first groove to the exterior surface of the second pipe section.

4. The pipe grip of claim 2 further comprising a second groove spaced from the first groove along the interior surface of the second pipe section, said second groove receiving a second tensioner at least partially therein.

5. The pipe grip of claim 4 wherein the second tensioner is a portion of a pipe restraint.

6. The pipe grip of claim 5 wherein the tension applicator applies at least a tension force to the first and second tensioners simultaneously.

7. The pipe grip of claim 1 wherein the second section is selected from the group of a bell end of a pipe segment, a flange, a valve, a coupler, and a fitting.

8. The pipe grip of claim 1 wherein the tension device at least assists in providing one of seal at a joint and a pipe restraint.

9. The pipe grip of claim 1 wherein the tensioner further comprises an enclosing member selected from the group of a cable, a wire, a strap, and a belt having opposing ends forming at least one loop about the first pipe section.

10. The pipe grip of claim 9 wherein enclosing member forms at last two complete loops about the first pipe section.

11. The pipe grip of claim 9 wherein the tensioner is at least partially located in a first groove extending into the second section from the interior surface of the second pipe section.

12. The pipe grip of claim 11 wherein the first bore extends from the first groove to the exterior surface of the second section.

13. The pipe grip of claim 9 further comprising a first groove along the interior surface of the second section, said first groove receiving the tensioner at least partially therein.

14. The pipe grip of claim 1 wherein the tensioner extends at least around 135 degrees of the first pipe section.

15. A pipe grip comprising:

a first pipe section having an exterior surface received internally to an end of a second section having an interior and exterior surface, said second section having a first bore extending intermediate the interior and exterior surface of the second section;

a second bore extending intermediate the interior and exterior surfaces of the second section, said second bore spaced apart from the first bore;

a tensioner selectively directing a compressive force toward the exterior surface of the first pipe section from internal to the interior surface of the second section;

wherein a tension application device is connected to the tensioner through the first bore, said tension application device selectively communicating tension through the bore whereby the application of tension compresses at least a portion of the tensioner radially inwardly towards the exterior surface of the first pipe section; and wherein the tension application device comprises at least one of (a) a clamp, and (b) a threaded rod cooperating with a nut.

* * * * *